Nov. 25, 1952     E. F. GRANT     2,619,538
WAVE GUIDE ATTENUATOR
Filed May 23, 1944
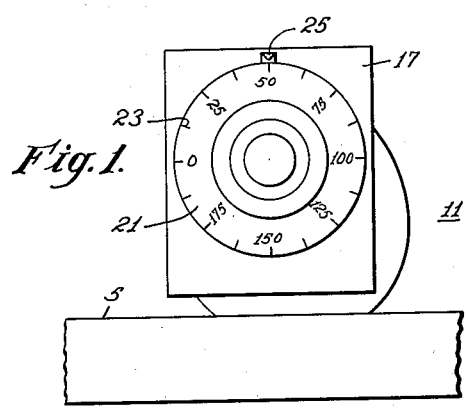
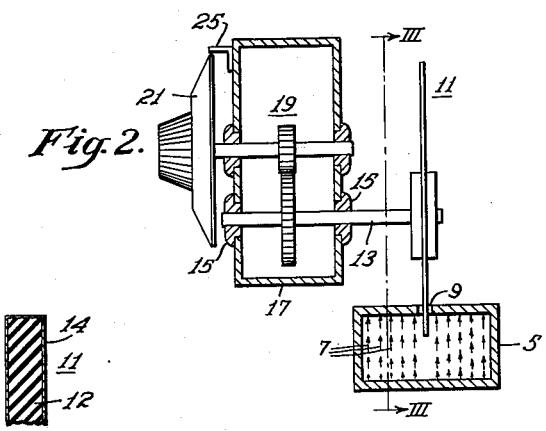
WITNESSES:
Edward Michaels
John P. Shipman
INVENTOR
Eugene F. Grant.
BY
F. W. Lyle
ATTORNEY Patented Nov. 25, 1952

2,619,538

UNITED STATES PATENT OFFICE 2,619,538

WAVE GUIDE ATTENUATOR

Eugene F. Grant, Pittsburgh, Pa., assignor to Westinghouse Electric Corporation, East Pittsburgh, Pa., a corporation of Pennsylvania Application May 23, 1944, Serial No. 536,884

20 Claims. (Cl. 178—44)

This invention relates to hollow wave guide systems for ultra-high-frequency electromagnetic waves; and has particular relation to apparatus for attenuating the electromagnetic waves passing through a hollow wave guide section.

In ultra-high-frequency hollow wave guide systems, it is frequently desirable to attenuate the flow of electrical energy in a particular section or branch of the wave guide. The wave guide is usually formed of a hollow pipe having highly conductive interior walls. Such a wave guide ordinarily has but very slight attenuation, provided the lateral dimensions of the guide are properly related to the wave-length of the electromagnetic waves to be passed therethrough.

As is well-known in the art, there is a certain minimum cutoff frequency related to the lateral dimensions of a wave guide below which the attenuation in the electromagnetic energy through the guide is a rapidly decreasing exponential function. In the past, it has been the practice to make use of this fact to obtain such attenuation as might be desired. A section of wave guide having such lateral dimensions as to have a cutoff frequency below the frequency of the electromagnetic waves to be passed through the system is inserted in the circuit. In this reduced section, the energy flow decays exponentially along the length of the section. By making the wave guide section a suitable length, any desired attenuation may be attained.

In practice, however, it is frequently necessary to be able to regulate or adjust the total amount of attenuation, which has proven very difficult in arrangements of the type just described. The adjustment of the amount of attenuation has been accomplished by providing the wave guide with sliding, telescopic joints whereby the length of the section of reduced lateral dimensions can be increased or decreased at will. However, the presence of such sliding joints not only increases the losses, but also creates a practical difficulty in moving one portion of the guide relative to the other, without disturbing the entire system. Moreover, the range of variation in attenuation is limited to a maximum of fifty percent in that it is impossible to telescope one portion of the pipe into the other by more than the length of one portion.

Another difficulty encountered in the use as an attenuator of a wave guide section of below cut-off dimensions is the production of reflections and resulting standing waves in the wave-guide system. It is almost impossible to avoid these standing waves when a reduced section of the wave guide is employed as an attenuator. Consequently, the losses in the system are rather high.

It is, accordingly, an object of my invention to provide new and improved apparatus for attenuating the passage of electromagnetic energy through a hollow wave guide.

Another object of my invention is to provide an attenuator for a hollow wave guide in which the amount of attenuation may be readily varied at will over a very wide range.

Still another object of my invention is to provide apparatus for attenuating the passage of electromagnetic energy through a hollow wave guide in which the amount of attenuation can be varied from zero over a wide range.

A further object of my invention is to provide apparatus for attenuating the passage of electromagnetic energy through a hollow wave guide in which the amount of attenuation can be readily varied without providing sliding or other movable sections in the wave guide itself.

A still further object of my invention is to provide a novel attenuator for electromagnetic waves in which the production of standing waves is substantially avoided.

In accordance with my invention, the attenuation of the electromagnetic energy is obtained by inserting, in effect, a high resistance in the circuit. The resistance is provided by a plate having a high resistance positioned within the wave guide parallel to the electric field vector of the electromagnetic waves. Currents then flow in the plate and the high resistance thereof effects an appreciable loss in energy. The amount of energy thus absorbed may be adjusted by adjusting the size of the plate within the guide.

The features of my invention which I consider novel are set forth with more particularity in the appended claims. The invention itself, however, together with additional objects and advantages thereof, may be best understood from the following description of a specific embodiment, as illustrated in the accompanying drawings, in which:

Figure 1 is an end view of a preferred embodiment of my invention;

Fig. 2 is a cross-sectional view of the apparatus of Fig. 1;

Fig. 3 is a detail view illustrating different positions of the attenuator of Fig. 1; and Fig. 4 is an enlarged cross-sectional view of a portion of the attenuator.

As illustrated in the drawings, a hollow wave guide 5 is provided which has a rectangular cross-section. As is well-known in the art, such a wave guide has an electric field the vector of which may be represented by the arrows 7 in Fig. 2. A slot-like opening 9 is provided in a wall of the wave guide 5, which wall is at substantially right-angles to the electric field vector. The slot-like opening 9 extends lengthwise of the wave guide 5, and preferably along the center of the wall, to avoid any appreciable loss of energy through the opening.

A plate-like member or disc 11 is mounted on a shaft 13 supported in bearings 15 in a housing 17. The disc 11 is mounted substantially parallel to the electric field of the electromagnetic waves within the guide with a portion thereof projecting into the slot-like opening 9 in the guide.

The shaft 13 on which the disc 11 is mounted is connected through gearing 19 to an adjustable dial 21 at the front of the housing 17. Rotation of the dial 21 effects a corresponding rotation of the shaft 13 and the disc 11 mounted thereon so that the disc 11 may be set to various rotatable positions corresponding to different amounts of attenuation. A calibrated scale 23 on dial 21 cooperates with a pointer 25 on the housing 17 to indicate the amount of attenuation corresponding to the position of the disc 11.

To obtain the desired strength and rigidity, I prefer to form the disc 11 of a thin card of insulating material 12, such as micarta, having a coating 14 of a colloidal suspension of carbon approximately .002 to .003 of an inch thick on both sides, the entire disc being of the order of $\frac{1}{32}$ of an inch thick as shown in Fig. 4. This thin coating may have a high electrical resistance of the order of 50 to 500 ohms per square although for purposes of an adjustable attenuator for measurement purposes, a resistance of the order of 100 to 200 ohms per square is usually satisfactory.

The term "ohms per square" is commonly used in designating the resistance of a layer, coating or sheet of material to an edgewise current as would be found in ultra-high frequency work where currents flow edgewise in a very thin layer at the surface of a conductive material upon which electromagnetic waves are incident. As is well known in the art, the ohms per square resistance of a layer of a material is equal to the resistivity constant of the material divided by the thickness of the layer.

While the edge of the disc 11 tends to introduce wave reflections, it has been found that with a thin disc and a suitable resistance, appreciable reflections may be substantially avoided. Of course other materials may be used in forming the disc although it is desirable to use an insulating base since discs formed solely of high resistance material of which I am aware are not strong enough and with a base of slightly lower resistance, more reflections and less attenuation is obtained.

The peripheral edge of the disc 11 is other than circular with respect to the center of the shaft 13, so that rotation of the disc varies the surface area of that portion of the disc 11 which extends into the wave guide 5. The high resistance surface of the portion of the disc 11 extending into the wave guide 5 offers sufficient resistance to the flow of electromagnetic energy to cause an appreciable attenuation. The amount of attenuation, of course, depends upon the surface area of that portion of the disc within the guide for any given disc resistivity.

When the attenuator is to be used to provide a selected amount of attenuation, I prefer to use a disc 11 having a peripheral edge in the form of a spiral, as illustrated in Fig. 3. The minimum radius of the disc 11 may be equal to the distance from the center of the shaft 13 to the inside of the upper wall of the wave guide 5 in which the slot-like opening 9 is provided. Consequently, when the disc 11 is in the position, illustrated by the broken line, in which its edge does not extend below the level of the inside of the upper wave guide wall, there is no attenuation of the electromagnetic energy. On the other hand, the maximum radius of the disc 11 may be made such that the disc just clears the lower wall of the wave guide opposite the opening 9. With the disc 11 in a position, illustrated by the full line, in which its edge just clears the lower wall of the guide, maximum attenuation is provided. Of course, discs having other peripheral shapes may be used as desired, the only difference being that the rate of change in attenuation as the disc is rotated, is altered.

I have found that an attenuating apparatus, as described, has a wide range of adjustment which may be accurately calibrated. The apparatus is mechanically simple and presents no difficulties in construction. It does not produce any appreciable standing waves, but instead provides for attenuation by absorption of the energy.

While I have illustrated the principles of my invention by a specific embodiment thereof, it will be understood by those skilled in the art that these principles may be applied in many other embodiments.

I claim as my invention:

1. In combination, a hollow guide for ultra-high-frequency electromagnetic waves having a conductive inner wall and having a slot-like opening lengthwise of said guide in a portion thereof in which said wall is at substantially right-angles to the electric field of said waves, and a plate-like member mounted substantially parallel to said electric field with a preselected portion of said member projecting through said opening into said guide, said member having a conductive surface layer of a resistance substantially greater than that of said inner wall, whereby a preselected amount of attenuation for said waves is provided.

2. In combination with a hollow guide for ultra-high-frequency electromagnetic waves having a conductive inner wall and having a slot-like opening lengthwise of said guide in a portion thereof in which said wall is at substantially right-angles to the electric field of said waves, a plate-like member mounted substantially parallel to said electric field with a portion of said member projecting through said opening into said guide, said member having a conductive surface layer of a resistance substantially greater than that of said inner wall, and means for varying the surface area of the portion of said member projecting into said guide to vary the amount of attenuation of said waves provided thereby.

3. In combination with a hollow wave guide for ultra-high-frequency electromagnetic waves having a slot-like opening lengthwise of said guide in a wall thereof at substantially right-angles to the electric field of said waves, a plate-like member mounted substantially parallel to said electric field with a portion of said member projecting through said opening into said guide, said member being formed of an insulating material coated with a conductive material with the coating having a resistance of the order of 50 to 500 ohms per square, and means for varying the surface area of the portion of said member projecting into said guide to vary the amount of attenuation of said waves provided thereby.

4. In combination with a hollow wave guide for ultra-high-frequency electromagnetic waves having a slot-like opening lengthwise of said guide in a wall thereof at substantially right-angles to the electric field of said waves, a plate-like member mounted substantially parallel to said electric field with a portion of said member projecting through said opening into said guide, said member being formed of an insulating material coated with a conductive material approximately .002 to .003 of an inch thick with the coating having a resistance of the order of 50 to 500 ohms per square, and means for varying the surface area of the portion of said member projecting into said guide to vary the amount of attenuation of said waves provided thereby.

5. In combination with a hollow wave guide for ultra-high-frequency electromagnetic waves having a conductive inner wall and having a slot-like opening lengthwise of said guide in a portion thereof in which said wall is at substantially right-angles to the electric field of said waves, a disc rotatably mounted alongside said guide and substantially parallel to said electric field with a portion of said disc projecting into said guide through said opening, said disc having a peripheral edge other than circular with respect to the center of rotation, and having a conductive surface layer with a resistance substantially greater than that of said inner wall, and means for rotating said disc whereby the surface area of the portion projecting into said guide may be varied to vary the attenuation of the electromagnetic energy provided thereby.

6. In combination with a hollow wave guide for ultra-high-frequency electromagnetic waves having a slot-like opening lengthwise of said guide in a wall thereof at substantially right-angles to the electric field of said waves, a disc rotatably mounted alongside said guide and substantially parallel to said electric field with a portion of said disc projecting into said guide through said opening, said disc being formed of an insulating material coated with a conductive material with the coating having a resistance of the order of 50 to 500 ohms per square, said disc also having a peripheral edge other than circular with respect to the center of rotation, and means for rotating said disc whereby the surface area of the portion projecting into said guide may be varied to vary the attenuation of said waves provided thereby.

7. In combination with a hollow wave guide for ultra-high-frequency electromagnetic waves having a slot-like opening lengthwise of said guide in a wall thereof at substantially right-angles to the electric field of said waves, a disc of an insulating material coated with a colloidal suspension of carbon of approximately .002 to .003 of an inch thick with the coating having a resistance of the order of 50 to 500 ohms per square, said disc being rotatably mounted alongside said guide substantially parallel to said electric field with a portion of said disc projecting into said guide through said opening and having a peripheral edge other than circular with respect to the center of rotation, and means for rotating said disc whereby the surface area of the portion projecting into said guide may be varied to vary the attenuation of said waves provided thereby.

8. In combination with a hollow wave guide for ultra-high-frequency electromagnetic waves having an inner conductive wall and having a slot-like opening lengthwise of said guide in a portion thereof in which said wall is at substantially right-angles to the electric field of said waves, a disc having a surface layer with a resistance substantially greater than that of said inner wall rotatably mounted alongside said guide substantially parallel to said electric field with a portion of said disc projecting into said guide through said opening, said disc having a peripheral edge other than circular with respect to the center of rotation, means for rotating said disc whereby the surface area of the portion projecting into said guide may be varied to vary the attenuation of said waves provided thereby, said rotating means including calibrated indicating means enabling the selection of a desired amount of attenuation.

9. In combination with a hollow wave guide for ultra-high-frequency electromagnetic waves having an inner conductive wall and having a slot-like opening lengthwise of said guide in a portion thereof in which said wall is at substantially right-angles to the electric field of said waves, a disc rotatably mounted alongside said guide and substantially parallel to said electric field with a portion of said disc projecting into said guide through said opening, said disc having a peripheral edge in the shape of a spiral with a minimum radius equal to the distance from the center of rotation of the disc to the inside of the wall having said opening therein and a maximum radius equal to the distance from the center of rotation of the disc to the inside of the wall of the guide opposite said wall having the opening therein, said disc also having a conductive surface layer of a resistance substantially greater than that of said inner wall, and means for rotatably adjusting said disc to vary the surface area of the portion projecting into said guide to vary in turn the attenuation of the electromagnetic energy provided thereby.

10. In combination with a hollow wave guide for ultra-high-frequency electromagnetic waves having a slot-like opening lengthwise of said guide in a wall thereof at substantially right-angles to the electric field of said waves, a disc rotatably mounted alongside said guide and substantially parallel to said electric field with a portion of said disc projecting into said guide through said opening, said disc having a peripheral edge in the shape of a spiral with a minimum radius equal to the distance from the center of rotation of the disc to the inside of the wall having said opening therein and a maximum radius equal to the distance from the center of rotation of the disc to the inside of the wall of the guide opposite said wall having the opening therein, said disc being formed of an insulating material coated with a conductive material approximately .002 to .003 of an inch thick with the coating having a resistance of the order of 50 to 500 ohms per square, and means for rotatably adjusting said disc to vary the surface area of the portion projecting into said guide to vary in turn the attenuation of the electromagnetic energy provided thereby.

11. A variable attenuator for electromagnetic waves comprising a section of hollow wave guide having a longitudinal slot in a wall thereof and a movable vane having a high ohmic resistance projecting into said section through said slot.

12. An attenuator in accordance with claim 11 in which the entering edge of said vane has a double taper in the longitudinal direction.

13. An attenuator in accordance with claim 11 in which said vane is arranged for rotation about an external point.

14. In combination with a hollow wave guide for ultra-high-frequency electromagnetic waves having an inner conductive wall and having a slot-like opening lengthwise of said guide in a portion thereof in which said wall is at substantially right-angles to the electric field of said waves, a disc having a surface layer with a resistance substantially greater than that of said inner wall rotatably mounted alongside said guide substantially parallel to said electric field with a portion of said disc projecting into said guide through said opening, said disc having a peripheral edge other than circular with respect to the center of rotation, means for rotating said disc whereby the surface area of the portion projecting into said guide may be varied to vary the attenuation of said waves provided thereby, said rotating means including indicating means enabling the selection of a desired amount of attenuation.

15. A variable attenuator for electromagnetic waves comprising a section of hollow wave guide having a longitudinal slot in a wall thereof, a movable vane having a high ohmic resistance projecting into said section through said slot and means for moving said vane into and out of said section.

16. A variable attenuator for electromagnetic waves comprising a section of hollow wave guide having a longitudinal slot in a wall thereof, a movable vane having a high ohmic resistance projecting into said section through said slot and means for indicating the penetration of said vane into said section.

17. A variable attenuator for electromagnetic waves comprising a section of hollow rectangular wave guide having a longitudinal slot in a wall thereof, and a movable vane having a high ohmic resistance projecting into said section through said slot.

18. A variable attenuator for electromagnetic waves comprising a section of hollow wave guide with unequal cross-sectional dimension having a longitudinal slot centrally located in a wall thereof, a movable vane having a high ohmic resistance projecting into said section through said slot and means for moving said vane into and out of said section.

19. A variable attenuator for electromagnetic waves comprising a section of hollow wave guide having a longitudinal slot in a wall thereof, a movable vane having a high ohmic resistance projecting into said section through said slot and arranged for rotation about a point external to said section and means for rotating said vane about said point.

20. A variable attenuator for electromagnetic waves comprising a section of hollow wave guide having a longitudinal slot in a wall thereof, a movable vane having high ohmic resistance projecting into said section through said slot, and means for moving said vane into and out of said section, said vane being parallel to the transverse electric field of the electromagnetic waves to be attenuated and the entering edge thereof having a double taper in the longitudinal direction and means for indicating the penetration of said vane into said section.

EUGENE F. GRANT.

REFERENCES CITED

The following references are of record in the file of this patent:

UNITED STATES PATENTS

| Number | Name | Date |
| --- | --- | --- |
| 2,088,749 | King | Aug. 3, 1937 |
| 2,151,157 | Schelkunoff | Mar. 21, 1939 |
| 2,306,282 | Samuel | Dec. 22, 1942 |
| 2,425,345 | Ring | Aug. 12, 1947 |